US012564116B2

(12) United States Patent
Linton

(10) Patent No.: US 12,564,116 B2
(45) Date of Patent: Mar. 3, 2026

(54) FARM AND AGRICULTURE EQUIPMENT

(71) Applicant: Lloyd Linton, Rockford, OH (US)

(72) Inventor: Lloyd Linton, Rockford, OH (US)

( * ) Notice: Subject to any disclaimer, the term of this patent is extended or adjusted under 35 U.S.C. 154(b) by 443 days.

(21) Appl. No.: 17/521,336

(22) Filed: Nov. 8, 2021

(65) Prior Publication Data

US 2022/0159890 A1 May 26, 2022

Related U.S. Application Data

(60) Provisional application No. 63/118,553, filed on Nov. 25, 2020.

(51) Int. Cl.
*A01B 15/02* (2006.01)
*E02F 5/32* (2006.01)

(52) U.S. Cl.
CPC .............. *A01B 15/025* (2013.01); *E02F 5/32* (2013.01)

(58) Field of Classification Search
CPC ....... A01B 15/025; A01B 49/027; A01B 3/04; A01B 3/00; A01B 49/02; A01B 13/08; A01B 17/008; A01B 19/10; A01B 15/02; A01B 15/06; A01B 15/08; E02F 5/32
See application file for complete search history.

(56) References Cited

U.S. PATENT DOCUMENTS 2,312,371 A * 3/1943 Strandlund ............ A01B 15/02
172/737
4,024,921 A * 5/1977 Tibbs, II ................ A01B 35/02
172/686

4,361,191 A * 11/1982 Landoll ................ A01B 49/027
172/198
4,607,707 A * 8/1986 Shellhouse .......... A01B 15/025
172/764
6,554,078 B1 * 4/2003 McDonald ........... A01B 49/027
172/73
6,896,068 B2 * 5/2005 Dietrich, Sr. ........ A01B 49/027
172/176
7,017,675 B2 * 3/2006 Ankenman ............ A01B 49/02
172/178
8,047,299 B2 * 11/2011 Hurtis ................... A01B 63/32
172/174
2008/0257574 A1 * 10/2008 Gonzalez ............ A01B 15/025
172/192
2018/0206386 A1 * 7/2018 Bell ..................... A01B 29/048
2018/0213712 A1 * 8/2018 Kline ..................... A01B 63/22
2020/0329626 A1 * 10/2020 Ferrari ................... G01S 19/00

* cited by examiner

*Primary Examiner* — Christopher J Sebesta
*Assistant Examiner* — Blake E Scoville

(57) ABSTRACT

Tractor implements can work the ground in a proper and efficient manner to ensure the ground is ready for planting. The tractor implements can be arranged in various, specific manners, in series behind a tractor, depending on field conditions. For example, the tractor may pull a single disc positioned ahead of each ripper disposed on a ripper implement. Behind the ripper, a roller implement may be disposed for lifting, rolling and breaking up the soil. An optional disc may be provided forward of each roller blade assembly. Behind the roller implement, one or more finishers, such as a disc, a multi-disc, a chopper, a basket, a double basket, a knife, a deflector, or the like, may be used to finish the worked soil. Soil prepared by such implements have been shown to significantly increase crop yield.

11 Claims, 12 Drawing Sheets

78

98

72,74

96

FARM AND AGRICULTURE EQUIPMENT

CROSS-REFERENCE TO RELATED APPLICATION

This application claims the benefit of U.S. provisional patent application No. 63/118,553, filed Nov. 25, 2020, the contents of which are herein incorporated by reference.

BACKGROUND OF THE INVENTION

1. Field of the Invention

Embodiments of the invention relate generally to farming and agriculture equipment. More particularly, embodiments of the invention relate to a four-part tractor implement that can quickly and efficiently prepare a field.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Preparing a field for planting can be time and labor intensive. Typically, a tractor will pull an implement over a field to break up, loosen and prepare the soil. Often, more than one pass is needed. Further, the tractor typically needs to move slowly, typically at 3-5 miles per hour, to ensure adequate working of the soil. Additionally, if the ground is wet, it can prove even further difficult to work the soil with typical implements. To add to the time and labor in preparing a field, often, the existing vegetation needs to be treated or killed before the plowing operation can begin.

In view of the foregoing, there is a need for improved apparatus and methods for preparing the soil in a field.

SUMMARY OF THE INVENTION

Embodiments of the present invention provide a soil treatment system comprising a ripper implement including a plurality of ripper arms extending from a frame, each of the plurality of ripper arms including an upper section extending downward toward a ground surface, a first bend creating a middle section extending at a first angle relative to the upper section, and a second bend creating a lower section extending at a second angle relative to the middle section, the lower section creating a ripper tip angled from about 15 to about 45 degrees relative to the ground.

In some embodiments, the system further includes a roller implement removably attached rearward the ripper implement, the roller implement including at least two rows of roller blade assemblies attached to a roller frame; and each roller blade assembly includes at least one blade attached to a roller arm extending from the roller frame, each roller blade having a lower surface angled rearward from about 15 degrees to about 45 degrees, each roller blade bent forward, and each roller blade twisted about a longitudinal axis thereof.

In some embodiments, the system further includes a finishing apparatus removably attached to the roller implement, the finishing apparatus including at least one of a multi-disc, a chopper, a single basket, a double basket and a deflector.

In some embodiments, the system further includes a double basket removable attached behind the finishing apparatus.

Embodiments of the present invention further provide a soil treatment system comprising a roller implement removably attached rearward the ripper implement, the roller implement including at least two rows of roller blade assemblies attached to a roller frame wherein each roller blade assembly includes at least one blade attached to a roller arm extending from the roller frame, each roller blade having a lower surface angled rearward from about 15 degrees to about 45 degrees, each roller blade bent forward, and each roller blade twisted about a longitudinal axis thereof.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
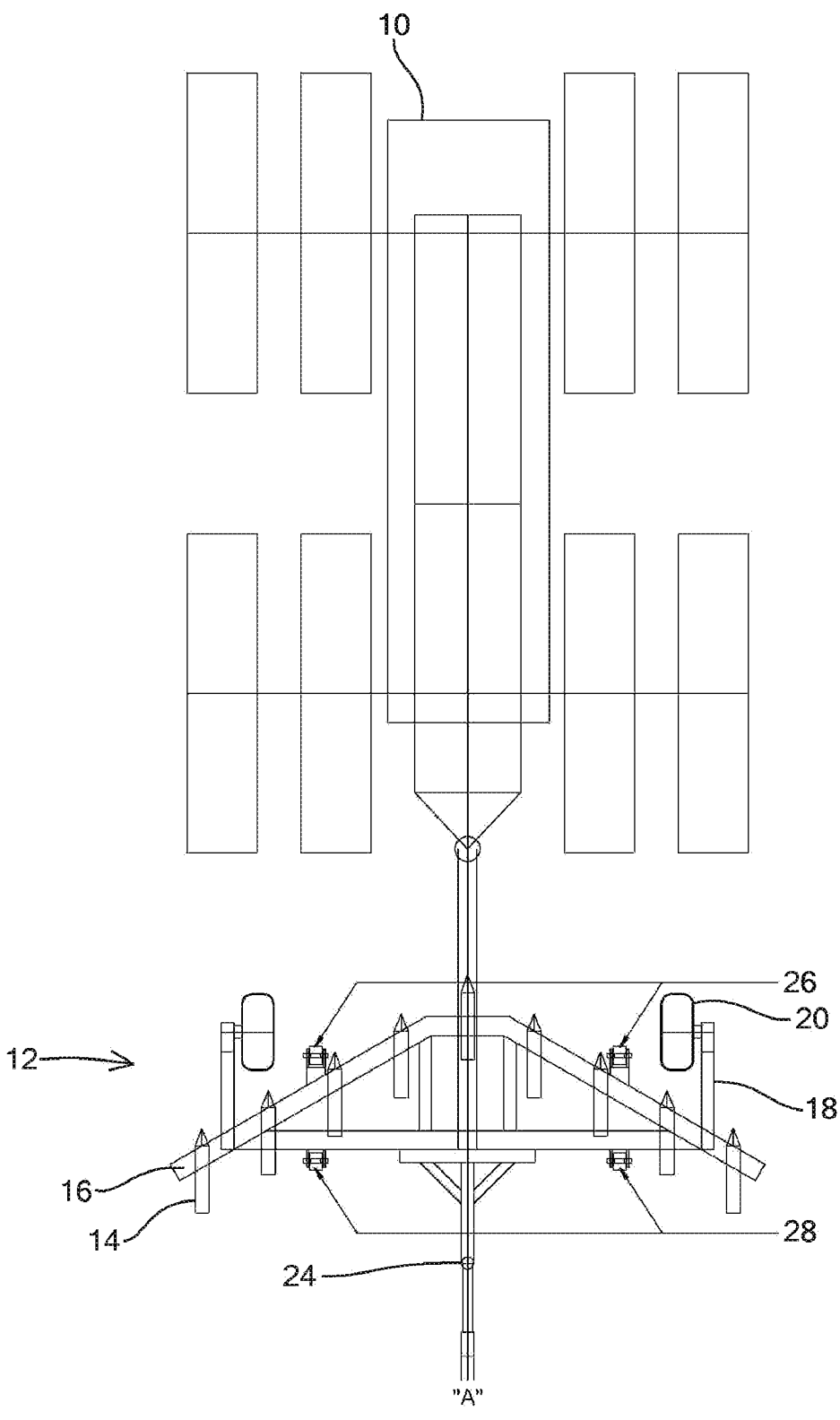
FIG. 1 illustrates a tractor and a first section (ripper) attached behind a tractor according to an exemplary embodiment of the present invention.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any device, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide tractor implements that can work the ground in a proper and efficient manner to ensure the ground is ready for planting. Typically, the tractor implements can be arranged in a specific manner, in series behind a tractor, depending on field conditions. For example, the tractor may pull a single disc positioned ahead of each ripper disposed on a ripper implement. Behind the ripper, a roller implement may be disposed, with an optional disc ahead of each roller blade section, for lifting, rolling and breaking up the soil. Behind the roller implement, one or more finishers, such as a disc, a multi-disc, a chopper, a basket, a double basket, a knife, a deflector, or the like, may be used to finish the worked soil. Soil prepared by such implements have been shown to significantly increase corn cob size, thus improving field yield.

The system can more quickly prepare a field by not only allowing the operator to move the implements at a faster speed over the ground, but also by not requiring a weed treatment, as the system has the ability to cut and mulch weeds into the soil. The rippers, as described below, can reach deep soil depths, allowing fertilization and aeration of the soil at extended depths (such as 1 foot to 2 feet, for example), improving root development and nutrient uptake by the plants along with deep water penetration into the soil. Further, the system can prepare a field that is both wet and dry, without any decrease in plough quality or speed. The system can separate for ease of storage. For example, the ripper can separate from the roller, which can separate from the finishing attachment. Each portion may store tipped upright, on top of each other, or the like, providing each of storage and modularity to use each implement separately or in any desired order.

The system, according to embodiments of the present invention, can include three or four different sections. The sections may be combined as shown in the Figures or may be used separately or in any combination thereof. For example, ripping and rolling can be obtained from the first and second sections only, while finishing may be performed later, if desired.

As discussed in detail below, the first section rips the soil loose and an optional single disc may be added in front of each v-angled ripper to further breakdown larger debris to prepare the soil for the second section. Due to the angle of the rippers, the soil breaks down before it gets to the tip of the rippers. With this angle, the rippers put pressure upward and forward instead of downward and backward, breaking the soil from the front forward above and below the surface.

After that process, as described in detail below, the second section may have an optional disc or a rolling knife basket, depending on the needs, to help break down the soil allowing for optimal performance for section two. The second section flips, rolls, and breaks-up the soil, allowing for nutrients and compost from the field to mix with the soil, similar to a mulching process. During the process of the second section, the ground is filled and leveled. What allows this process to work are the knives that are cut in an angle and are longer and wider and twist up and around with the end tip also helping break up the soil. The fluidity of this process can be attributed to the bracket that holds the knives being spring active.

The third section can have multiple configurations available within its three sections, allowing the user a variety of baskets such as a knife basket, a ridge basket, and the like, and discs. The third section can, in one example, include a small knife, a large knife, a deflector and a set of discs. The second section allows for the same configuration; however, the third section allows for the disc to move in various angles to fluff the soil. Depending on the multiple arrangements available and the conditions of the field, the user may use shields to deflect the soil downward. This process is determined by the condition of the field to prepare the soil for planting.

The fourth section can be, for example, a double basket with no springs or shocks to allow the machine to glide over the surface of the soil, but other finishers could be used. The gliding process is the preferred method, allowing gravity to work with the implement.

Depending on the field, the sections can be configured to meet the needs of the soil. This process allows for unprecedented speeds for different types of groundwork. Tested speeds of up to 16 mph with leveling and no bouncing in the process; speeds could be higher but not recommended due to safety concerns.

Figure 2:
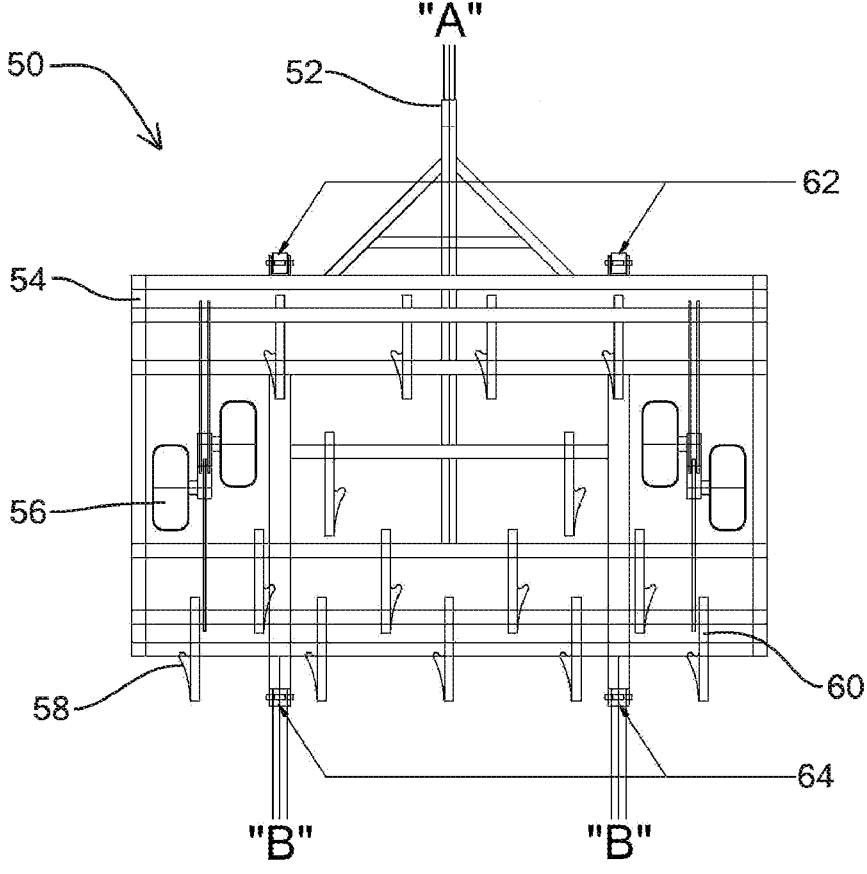
FIG. 2 illustrates a second section (roller) of a tractor implement according to an exemplary embodiment of the present invention, where point "A" of FIG. 1 continues to point "A" of FIG. 2.
Figure 3:
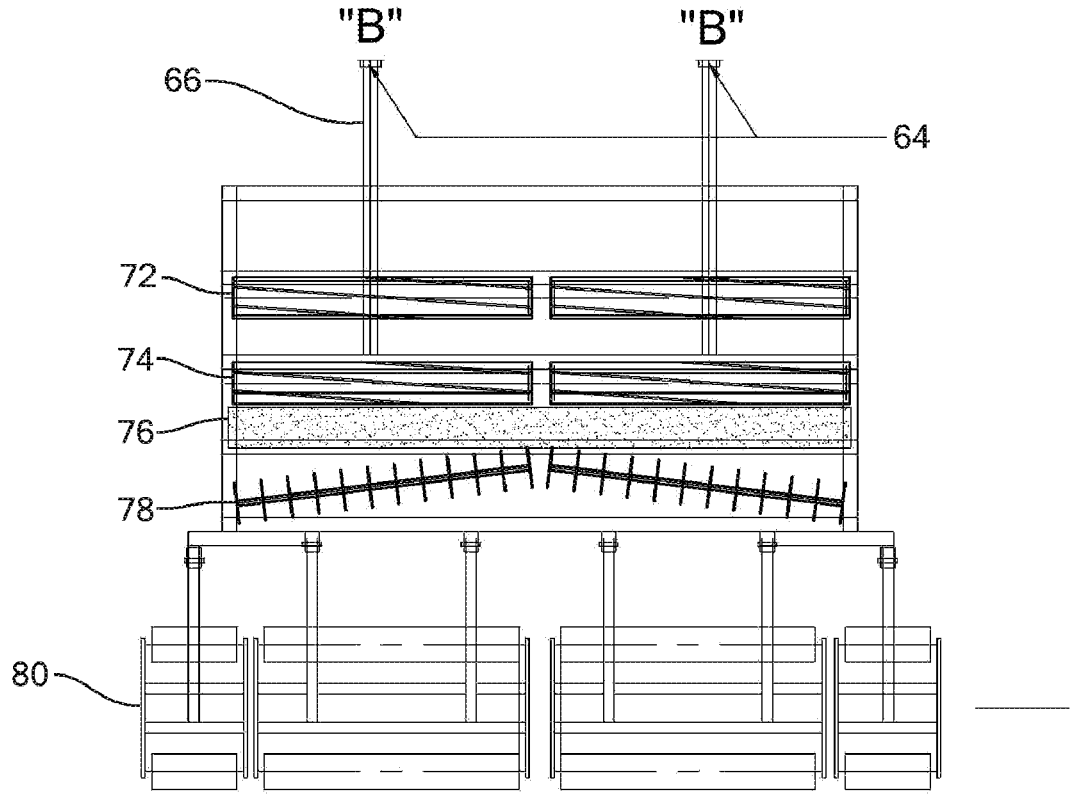
FIG. 3 illustrates a third section (knifes, deflector, discs) and a fourth section (double basket) of a tractor implement according to an exemplary embodiment of the present invention, where points "B" of FIG. 2 continue to points "B" of FIG. 3.

Referring to FIGS. 1 through 3, a tractor 10 can pull one or more implements (such as ripper 12, roller 50, and finishers 70, as described in greater detail below. The first implement can be a ripper implement 12 which can connect to the tractor 10 via various mechanisms, such as via a bar 22 connecting to a tractor hitch, via a three-point hitch, or the like. Optionally, a single disc 98 (see FIG. 14) can be mounted in front of each ripper arm 14. The single disc 98 may be used, for example, in fields having weeds or other vegetation (such as old corn stalks, for example), where the single disc 98 can break apart this vegetation to prevent such from getting caught on the ripper arm 14 or other downstream implements. The single disc 98 can be disposed either in-line with a direction of travel of the tractor 10 or may be angled up to about 30 degrees relative to the direction of travel, for example.

The ripper implement 12 may be useful for loosening soil at a significant depth, such as from about 1 foot to 2 feet or more, permitting water and nutrients to penetrate into the soil. Further, through use of the ripper implement 12, and the below described roller implement 50, removal or killing of weeds (typically by a weed/grass killing spray, for example) is not needed. Instead, the system, according to embodiments of the present invention, can mulch the weeds, last seasons corn stalks, and other vegetation, back into the soil as mulch and nutrients, thus aerating the soil and feeding the soil at the same time.

The ripper arms 14 can be supported by a ripper frame 16 supported by legs 18 connected to wheels 20. Forward connection points 26 may be positioned on the frame 16 for attaching an additional implement in front of the ripper implement 12. Rearward connection points 28 may be positioned on the frame 16 for attaching an additional implement behind the ripper implement 12. These connection points 26, 28 can be spaced apart on opposite sides of a center line of the implement, as shown. A pivot connection 24 may also be provided to pivotably connect an additional implement, such as the roller implement 50 via arm 52.

Figure 5A:
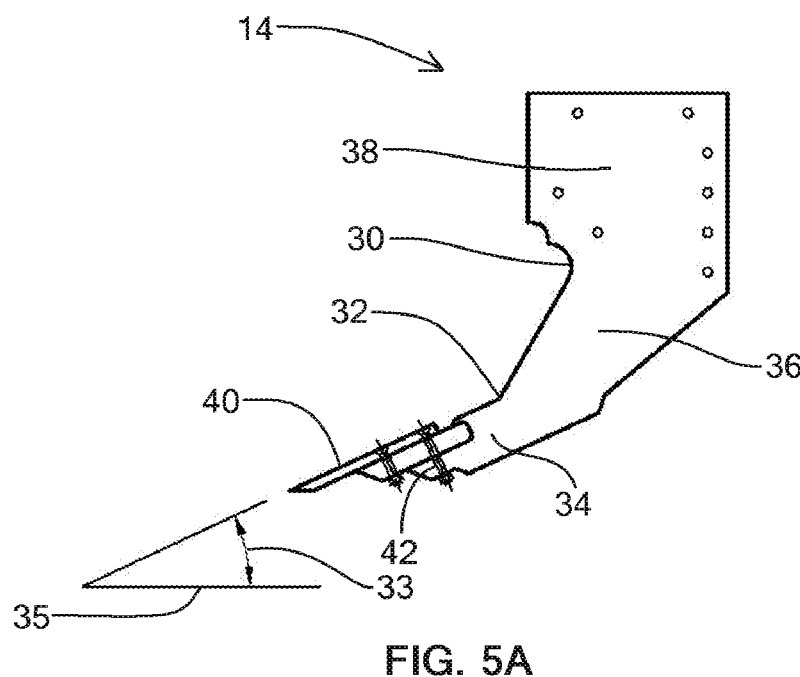
FIG. 5A illustrates a side view of a ripper used in the ripper implement according to an exemplary embodiment of the present invention.
Figure 5B:
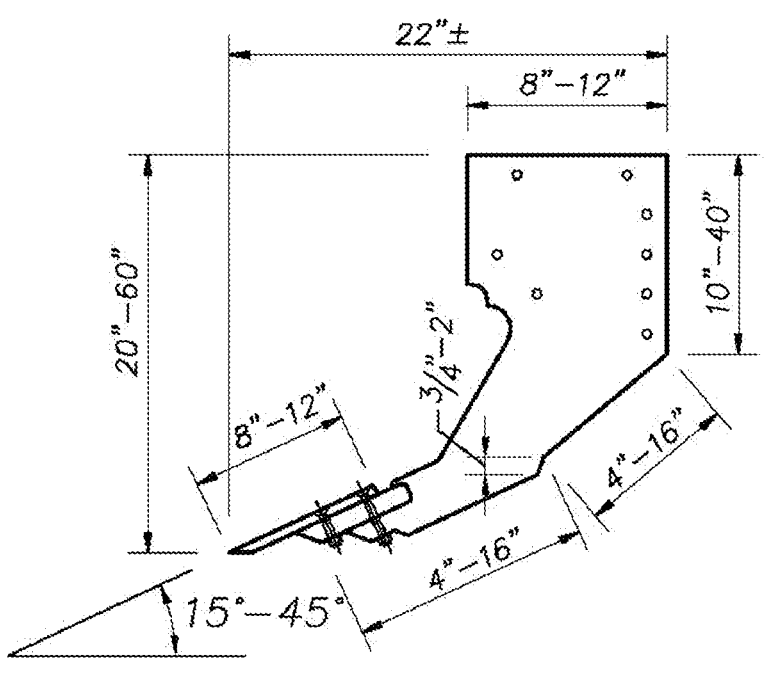
FIG. 5B illustrates the ripper of FIG. 5A, including one particular range for dimensions thereof, according to an exemplary embodiment of the present invention.

FIGS. 5A and 5B illustrate an exemplary embodiment of the ripper arm 14. The ripper arm 14 can include an upper portion 38 that can be mounted to the ripper frame 16. The upper portion 38 may be from about 8 inches to about 12 inches deep (depth being in the direction of travel) and from about 10 inches to about 40 inches in length. A central portion 36 can extend from the upper portion 38 with a bend 30 in the forward direction. The bend 30 can be from about 5 to about 40 degrees, typically about 10 to about 30 degrees. In some embodiments, the depth of the central portion can decrease from its proximal end (where it extends from the upper portion 38) to its distal end. The central portion 36 can have a length of about 4 inches to about 16 inches. A lower portion 34 can extend from the central portion 36 with a second bend 32 in the forward direction. The second bend 32 can be at an angle from about 10 to about 50 degrees, typically from about 20 to about 40 degrees. A replaceable ripper tip 40 can be attached via bolts 42, for example, to the lower portion 34. The bend 30 and the second bend 32 may result in the ripper tip 42 being disposed at an angle 33, relative to horizontal 35 (the ground) of about 15 degrees to about 45 degrees, typically from about 20 degrees to about 40 degrees. The overall depth of the ripper arms 14 can vary, depending on application, from about 20 inches to about 60 inches, for example.

The distal end of the ripper tip 40 may be from about 10 inches to about 14 inches forward of the forward surface of the upper portion 38. Such a configuration can permit the soil to break down before it gets to the tip of the rippers. With this configuration, the ripper arms 14 can puts pressure upward and forward instead of downward and backward, thus breaking the soil from the front forward above and below the surface. While the angles 30, 32 are shown as relatively sharp angles, such angles can be rounded to make a smooth transition.

The roller implement 50 is shown in FIG. 2. The roller implement 50 may also be referred to as, for example, a mulcher. Typically, this implement may be disposed behind the ripper implement 12. In some embodiments, a single disc 98 may be disposed in front of each of the roller arms 58. The roller implement 50 can include a frame 54 supported by wheels 56. Like the ripper implement 12, the roller implement 50 can include forward connecting points 62 and rear connecting points 64.

The roller implement 50 can be used to flip, roll and break-up the soil, allowing for nutrients and compost from the field to mix with the soil, similar to a mulching process. During the process of the roller implement 50, the ground can be filled and leveled. What allows this process to work are the knives 60 are cut in an angle and are longer and wider than conventional plough implements and twist up and around with the end tip also helping break up the soil. The knives 60 can be disposed in different manners as discussed in greater detail below.

Typically, from one to five rows of knives 60 are used in the roller implement 50, where four such rows are illustrated in FIG. 2. Of course, this can vary depending on the application, soil condition, or the like. When the knives 60 are single knives are each arm 58, the knives 60 may be arranged so that one row of knives rolls the soil in one direction and the next row rolls the soil in an opposite direction, as shown in FIG. 2. In other embodiments, the knives 60 can be arranged to roll the soil in different directions in each row. In other embodiments, multiple knives 60 can be disposed on each arm, as shown in FIGS. 6 through 8, discussed below.

As shown in FIG. 3, soil finishers 70 may be attached to the rear connecting points 64 of the roller implement 50 via arms 66. The soil finishers 70 can be similar to those known in the art and can include a small knife 72, a large knife 74, a deflector 76, a disc 78, a single basket 96 (see FIG. 16), a double basket 80 or the like. The arrangement of the soil finishers 70 can vary depending on application or such elements may not be used, depending on the application. In some embodiments, a planting implement may be disposed behind the last implement to permit soil preparation and planting in a single operation.

Figure 4:
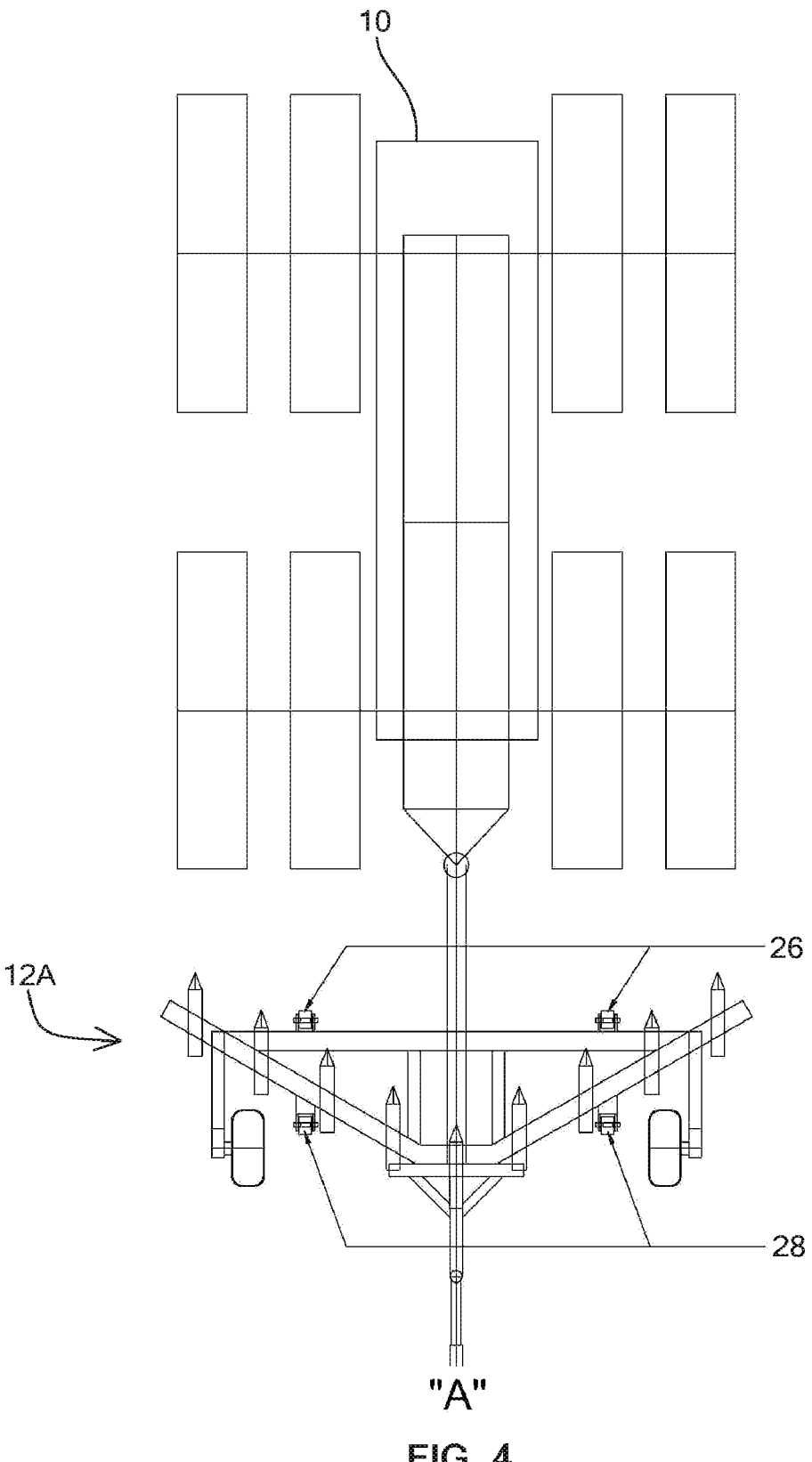
FIG. 4 illustrates a tractor and a first section (ripper) attached behind a tractor in an opposite configuration of that of FIG. 1.

As shown in FIG. 4, a ripper implement 12A can be arranged with the rippers disposed in a V-shape facing the tractor 10, as opposed to a V-shape facing away from the tractor 10. Of course, these are exemplary configurations and other configurations may be contemplated within the scope of the present invention.

Figure 6:
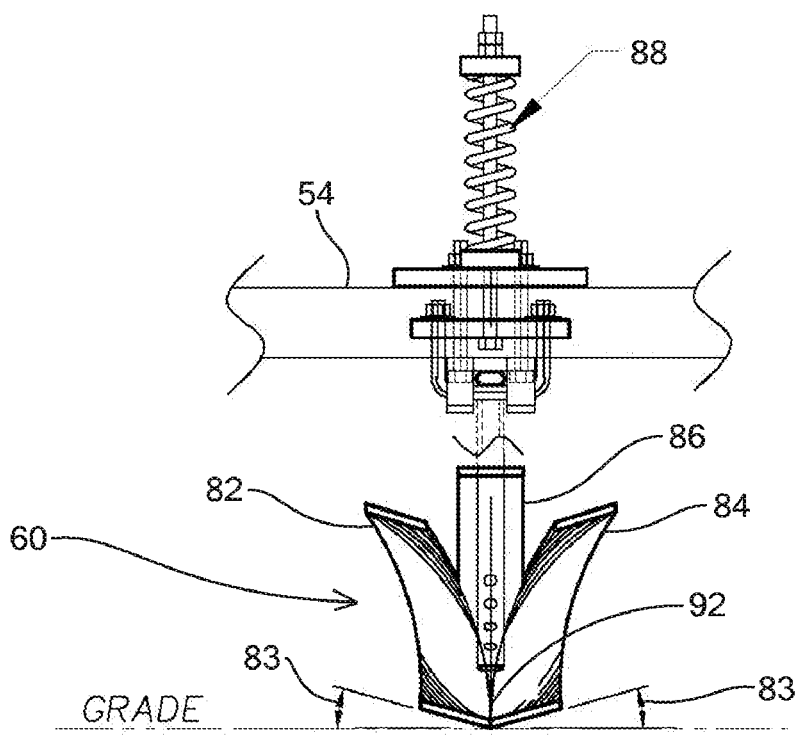
FIG. 6 illustrates a front view of a multi-blade roller used in the roller implement according to an exemplary embodiment of the present invention.
Figure 7:
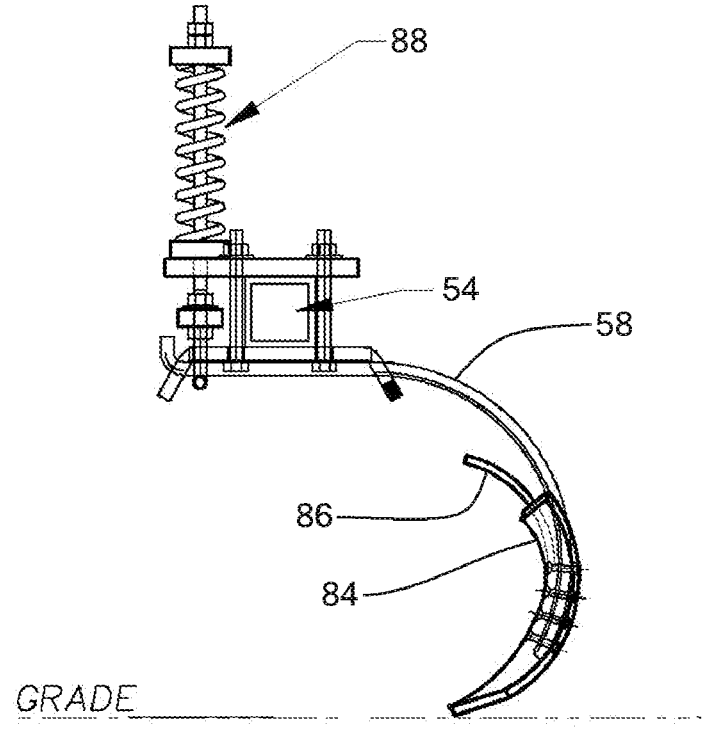
FIG. 7 illustrates a side view of the multi-blade roller of FIG. 6.
Figure 8:
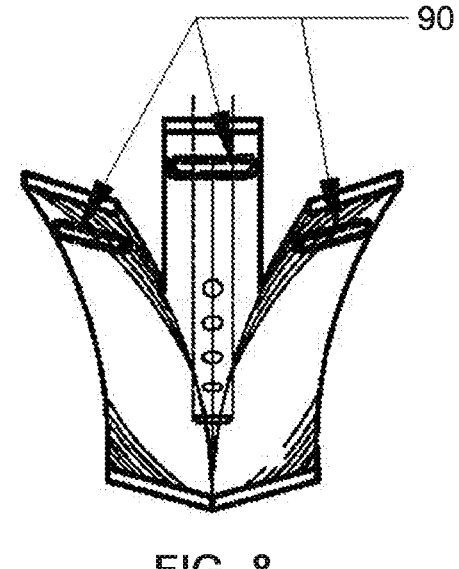
FIG. 8 illustrates a front view of the multi-blade roller of FIG. 6 including an optional bump element.

Referring now to FIGS. 6 through 8, details of the roller arm 58 and knives 60 are shown. In this embodiment, the roller knives 60 can each include a right side knife blade 82, a left side knife blade 84 and a central knife blade 86. The left and right knife blades 82, 84 can meet at a front edge 92 that extends about 10 percent to about 50 percent of the overall height of the blades 82, 84. The blades 82, 84 can angle backward, on grade, an angle 83 from about 15 degrees to about 45 degrees. The blades 82, 84 can span a width (combined, from an outer edge of the right knife blade 82 to the outer edge of the left knife blade 84) from about 4 inches to about 10 inches.

From their bottom, the blades 82, 84 can bend forward while twisting outward. The bend forward and the twist outward may be smooth and continuous along at least a portion of the length of the blades 82, 84. Thus, the blades 82, 84 can roll and break apart the soil as it is lifted along the bend and rolled outward by the twisted configuration.

Further, the center blade 86 can be bent forward, as best see in FIG. 7, further rolling the soil as the roller implement 50 moves forward. In some embodiments, the right and left blades 82, 84 can be from about 13 inches to about 20 inches high, while the center blade 86 can be from about 13 inches to about 26 inches high. Typically, the center blade 86 is higher than the right and left blades 82, 84 by about 4 inches to 8 inches, for example.

The arm 58 may be attached to the frame 54 and a spring 88 may be used to help absorb vertical movement of the blades 82, 84, 86.

In some embodiments, one or more bumps 90 may be positioned on the face of one or more of the blades 82, 84, 86 to help break up the soil as it passes over the blades. While FIG. 8 shows the bump 90 positioned near an upper end of the blades 82, 84, 86, other positions may include one or more bumps, depending on the particular application.

Figure 9:
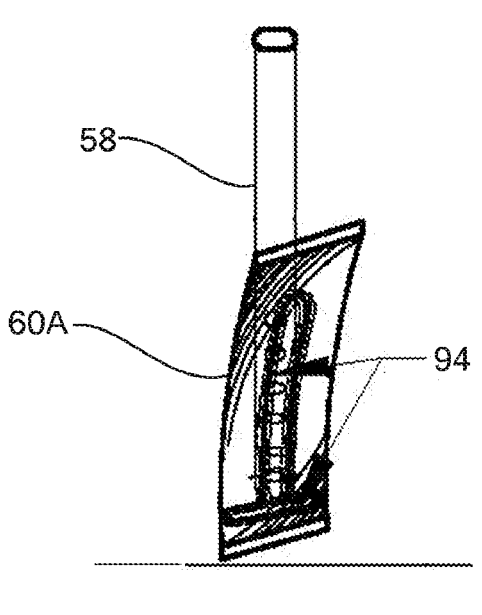
FIG. 9 illustrates a front view of a left rolling single blade roller used in the roller implement according to an exemplary embodiment of the present invention.
Figures 10, 11:
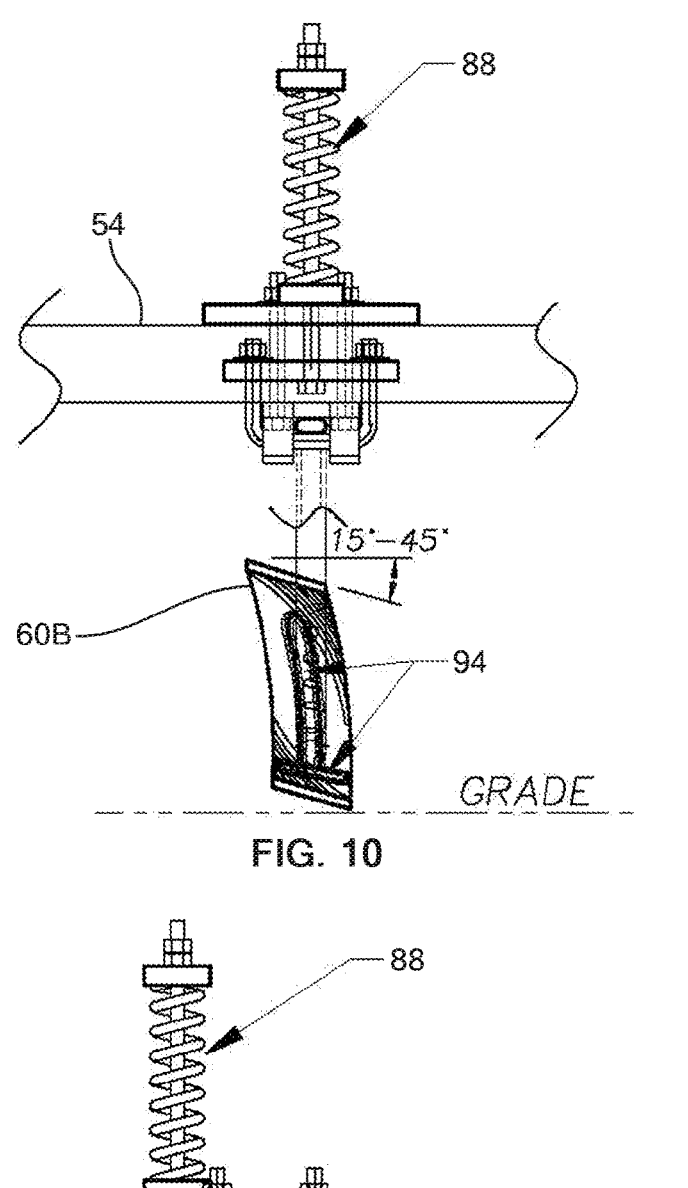
FIG. 10 illustrates a front view of a right rolling single blade roller used in the roller implement according to an exemplary embodiment of the present invention.
FIG. 11 illustrates a side view of the multi place roller of FIGS. 9 and 10.

Referring now to FIGS. 9 through 11, the knives 60 can be single blade, such as a left rolling blade 60A and a right rolling blade 60B. The blades 60A, 60B can be designed with the bend and twist similar to the blades 82, 84 described above. The amount of the bend in the blades 60A, 60B (as well as in blades 82, 84) can vary, depending on the application, as illustrated by angle 61 in FIG. 11. FIGS. 9 and 10 illustrate another embodiment for bumps 94 on the blade, where the bumps can be both vertically disposed and horizontally disposed, as illustrated.

Figures 12A, 12B:
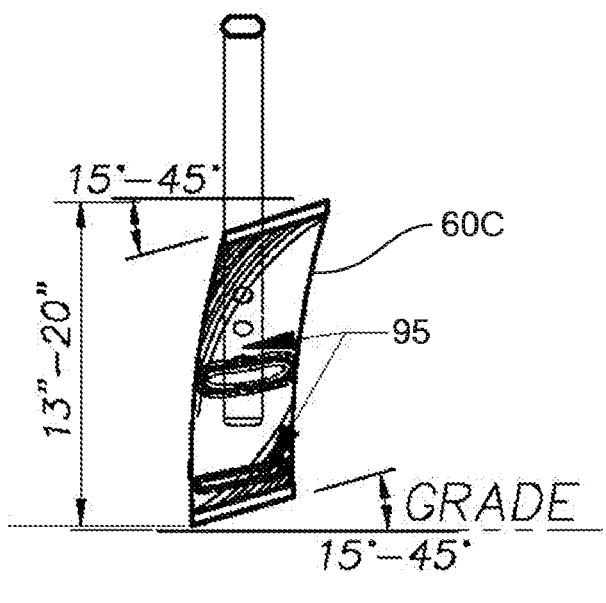
FIGS. 12A and 12B illustrates a front view of a left rolling single blade roller having a bump element in various locations according to an exemplary embodiment of the present invention.

FIG. 12A illustrates a left rolling blade 60C having a bump 95 disposed horizontally along its width at a lower and central portion of the blade 60C. FIG. 12D illustrates blade 60D having horizontal and vertical bumps 97 along with one or more mounting holes 99 useful for mounting a plowing accessory thereto, if desired.

Figure 13:
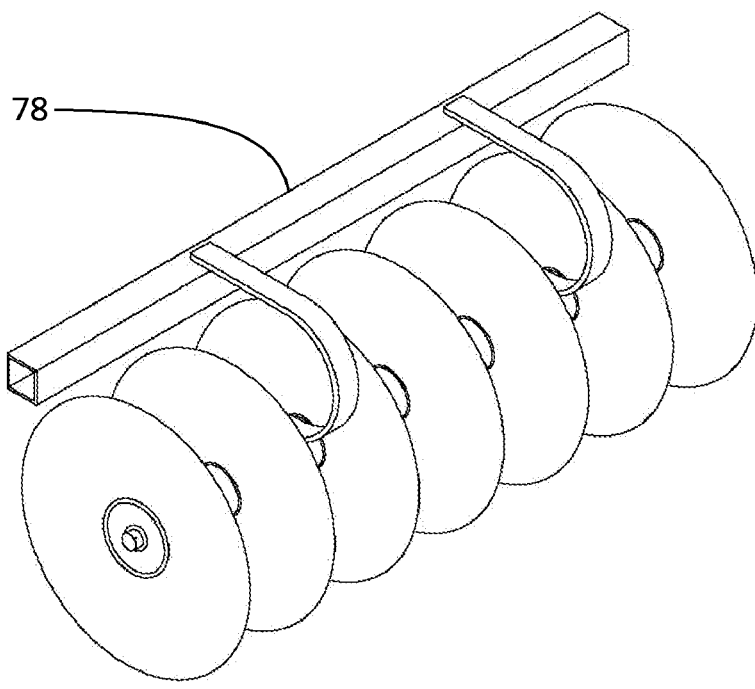
FIG. 13 illustrates a multi-disc attachment usable in the field preparation system according to an exemplary embodiment of the present invention.
Figure 14:
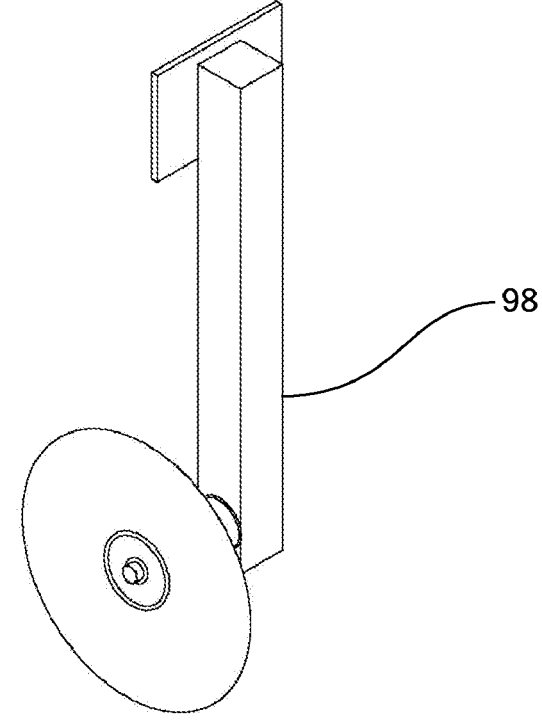
FIG. 14 illustrates a single disc attachment usable in the field preparation system according to an exemplary embodiment of the present invention.
Figure 15:
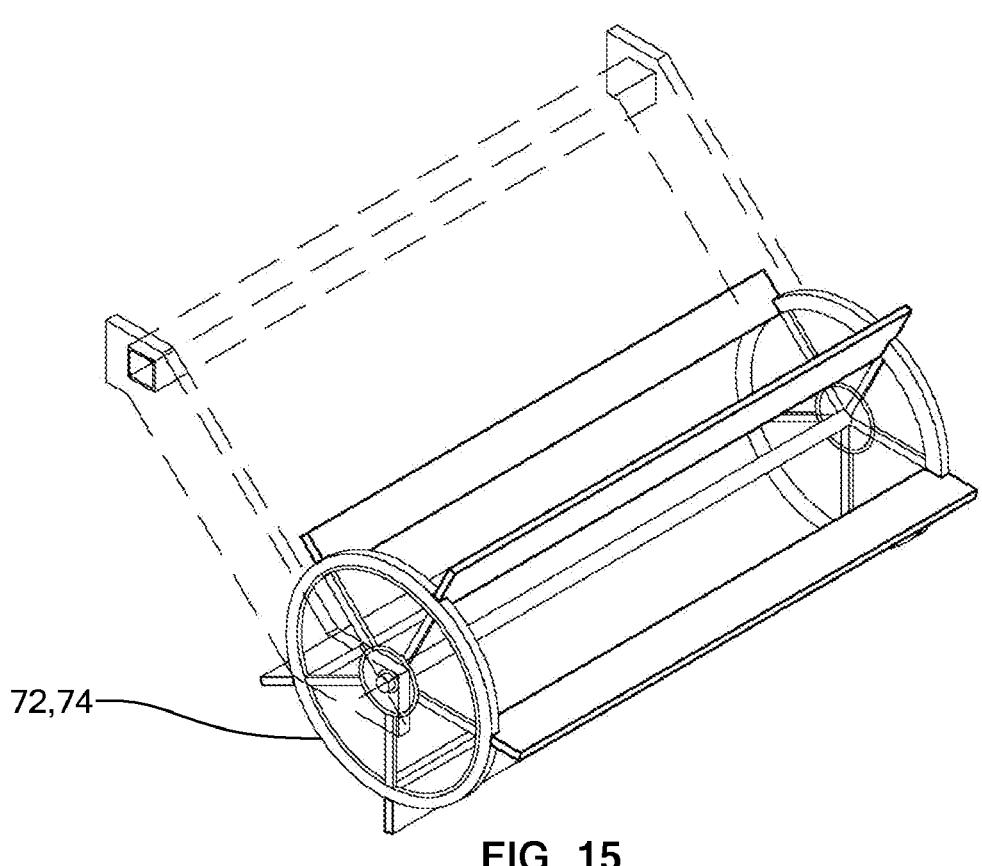
FIG. 15 illustrates a chopper attachment usable in the field preparation system according to an exemplary embodiment of the present invention.
Figure 16:
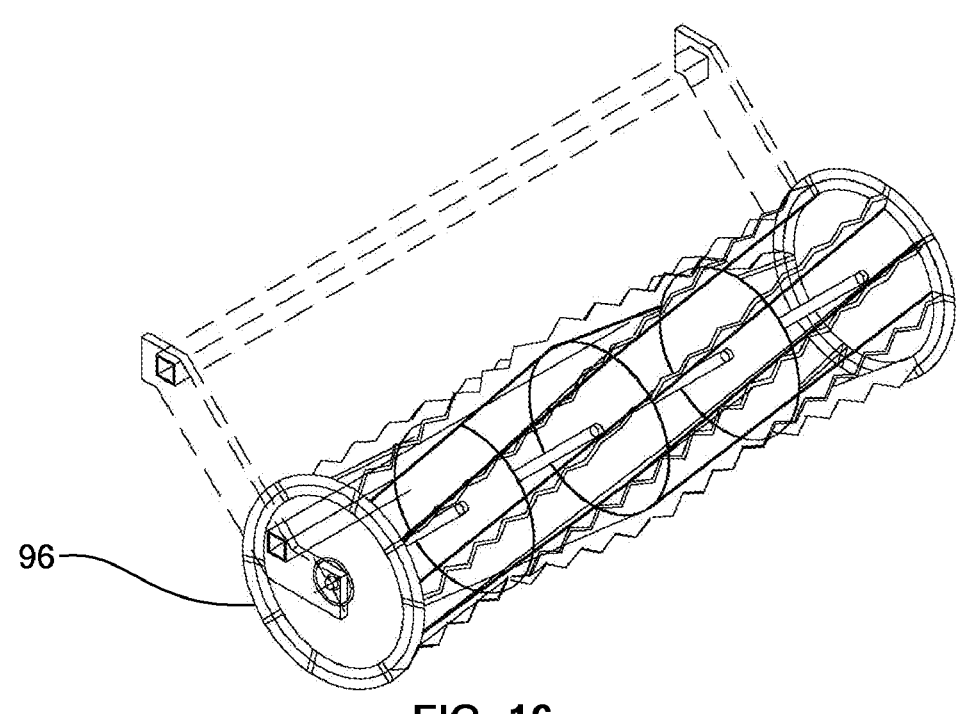
FIG. 16 illustrates a single basket attachment usable in the field preparation system according to an exemplary embodiment of the present invention.
Figure 17:
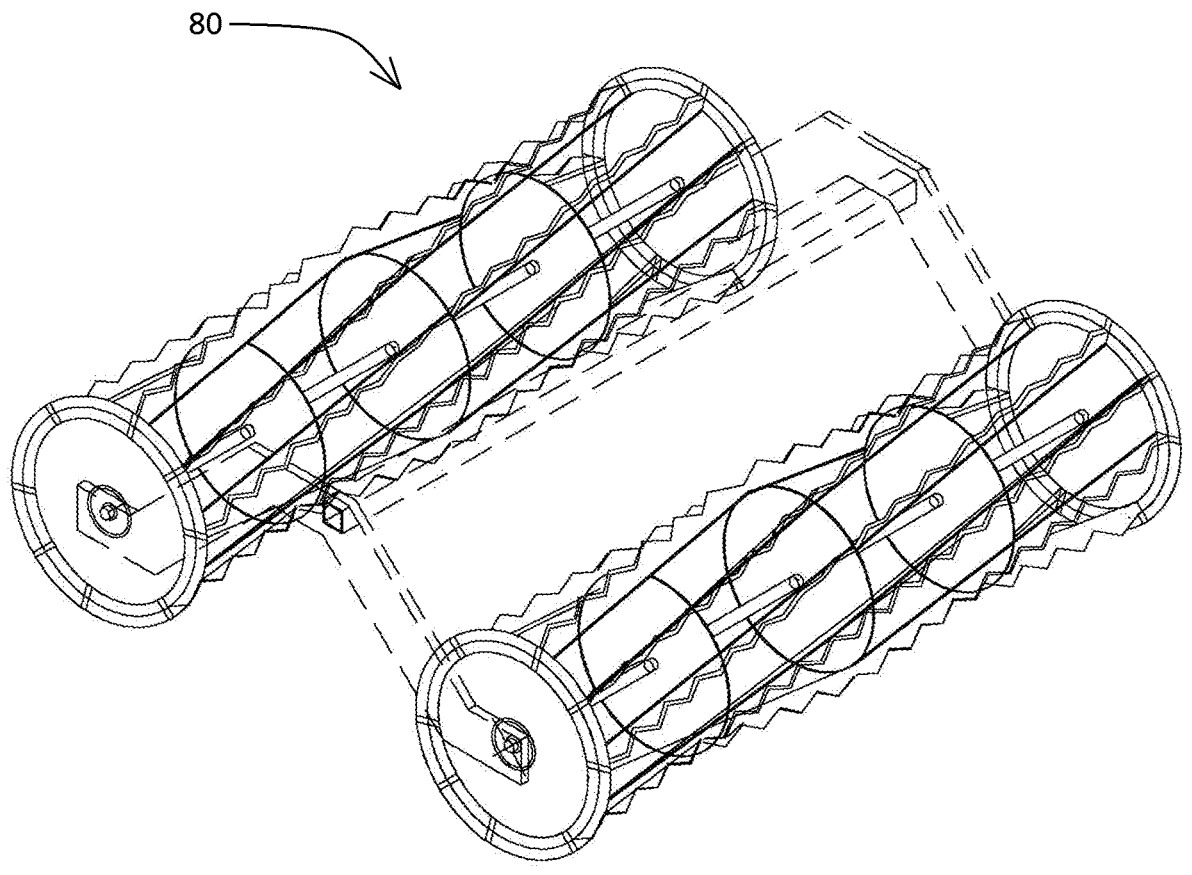
FIG. 17 illustrates a double basket attachment usable in the field preparation system according to an exemplary embodiment of the present invention.

FIGS. 13 through 17 illustrate detailed views of various attachments that can be used with the system according to embodiments of the present invention. FIG. 13 illustrates a multi-disc attachment 78, FIG. 14 illustrates a single disc attachment 98, FIG. 15 illustrates a chopper/knife attachment 72, 74, FIG. 16 illustrates a basket attachment 96 and FIG. 17 illustrates a double basket attachment 80.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A soil treatment system comprising:

a ripper implement including:

a plurality of ripper arms extending from a frame, each of the plurality of ripper arms including an upper section extending downward toward a ground surface, a first bend creating a middle section extending at a first angle relative to the upper section, and a second bend creating a lower section extending at a second angle relative to the middle section, the lower section creating a ripper tip angled from 15 to 45 degrees relative to the ground; and a roller implement removably attached rearward the ripper implement, the roller implement including:

at least two rows of roller blade assemblies attached to a roller frame;

each roller blade assembly includes at least one knife attached to a roller arm extending from the roller frame, each roller blade assembly having a lower surface angled rearward from 15 degrees to 45 degrees, each roller blade assembly bent forward, and each roller blade twisted about a longitudinal axis thereof, wherein:

each row of roller blades alternate between the row of blades being configured in a first direction and the row of blades being configured in a second, opposite direction; and each blade in a first row of blades is offset from each blade in an adjacent row of blades.

2. The soil treatment system of claim 1, wherein the ripper tip extends from 10 to 14 inches forward of a forward surface of the upper section.

3. The soil treatment system of claim 1, wherein each roller blade assembly includes a left rolling blade, a right rolling blade and a center blade, each of the left and right rolling blades having the lower surface angled in opposite directions, rearward, from 15 degrees to 45 degrees, each of the left and right rolling blades bent forward, and each of the left and right rolling blades twisted a longitudinal axis thereof.

4. The soil treatment system of claim 3, wherein the center blade is bent forward.

5. The soil treatment system of claim 3, wherein the center blade has a height greater than a height of the left and right rolling blades.

6. The soil treatment system of claim 3, wherein the left and right rolling blades meet at a lower front side edge thereof.

7. The soil treatment system of claim 1, further comprising a finishing apparatus removably attached to the roller implement, the finishing apparatus including at least one of a multi-disc, a chopper, a single basket, a double basket and a deflector.

8. The soil treatment system of claim 7, further comprising a double basket removable attached behind the finishing apparatus.

9. The soil treatment system of claim 1, wherein one or more of the roller blades includes one or more bumps protruding from a forward facing surface thereof.

10. The soil treatment system of claim 1, further comprising a single disc disposed forward each of the ripper arms.

11. The soil treatment system of claim 1, further comprising a single disc disposed forward each roller assembly.

* * * * *